Feb. 18, 1941. C. A. OLSON 2,232,340
VALVE SEAT GRINDER MECHANISM
Filed July 5, 1938 2 Sheets-Sheet 1
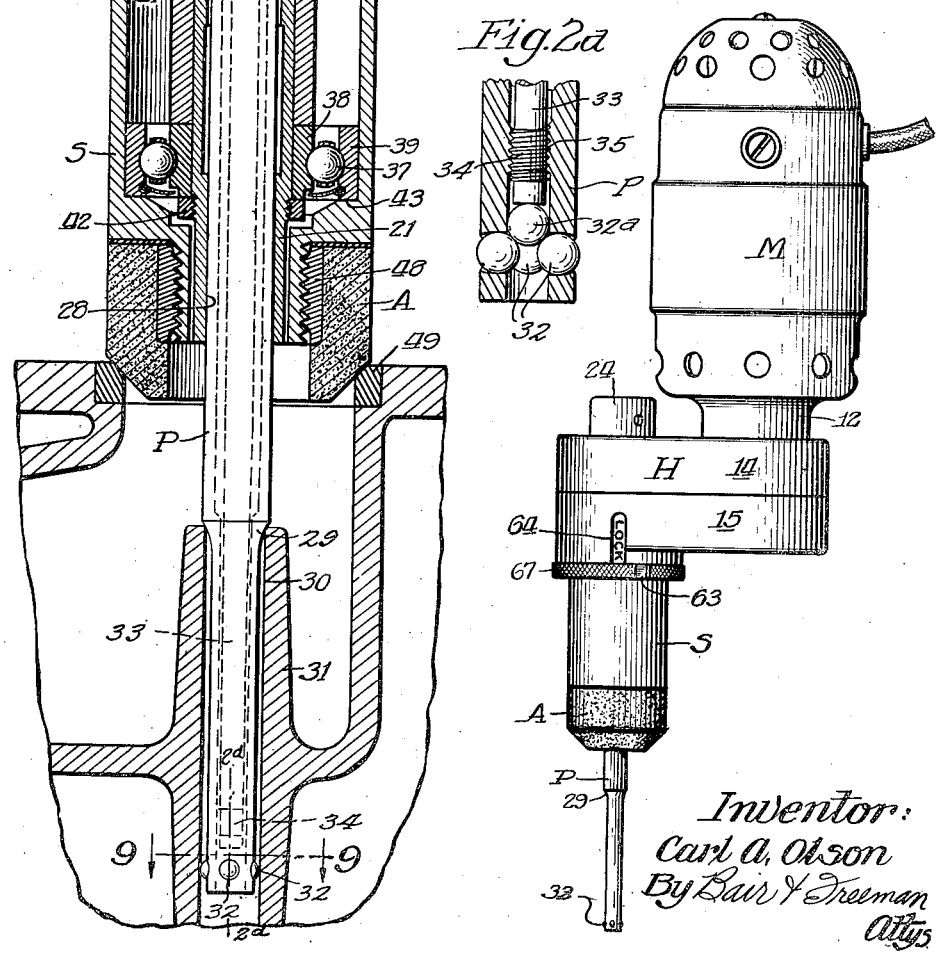
Inventor:
Carl A. Olson
By Bair & Freeman
Attys Feb. 18, 1941.  C. A. OLSON  2,232,340

VALVE SEAT GRINDER MECHANISM

Filed July 5, 1938  2 Sheets-Sheet 2

Inventor:
Carl A. Olson
By Bair & Freeman
Attys.

Patented Feb. 18, 1941

2,232,340

UNITED STATES PATENT OFFICE 2,232,340

VALVE SEAT GRINDER MECHANISM

Carl A. Olson, Clarinda, Iowa, assignor to Lisle Corporation, Clarinda, Iowa, a corporation of Iowa Application July 5, 1938, Serial No. 217,446

10 Claims. (Cl. 51—241)

An object of my invention is to provide valve seat grinder mechanism which is efficient and easy to operate and which can be inexpensively manufactured.

Another object is to provide grinder mechanism particularly adapted for grinding hardened valve seats of internal combustion engines, the mechanism being so designed and its parts being so arranged that a pilot thereof can be associated with a valve stem guide and used as a means to accurately guide the grinder to concentric position on the valve seat.

Another object is to provide a pilot for the grinder which is so constructed that it can be rigidly fixed in a true centered position in the bore of a valve stem guide for accurately guiding the grinder to its grinding position.

Another object is to provide a grinder which can be used on engines mounted in automobiles without the necessity of removing the engine therefrom to grind the valve seats, the device being designed so that the grinder is offset from the motor and therefore can be positioned under overhanging dash boards without the grinder motor striking the dash board during operation.

Still another object is to provide a power transmission housing secured to the grinder motor frame and a fixed stud carried by the housing in a position substantially out of alignment with the motor shaft so as to get the desired offset, there being power transmission means consisting of a resilient belt under tension on a drive pulley of the motor shaft and a driven pulley of a spindle which is rotatably mounted on the fixed stud, the belt thereby preventing any chatter in the finishing of the valve seat as experienced with gear transmissions.

Still another object is to provide the power transmission housing so designed that a stud is fixed to the upper wall thereof and a spindle is rotatably mounted on the stud and projects through the lower wall of the housing, an abrading member being carried by the lower end of the spindle and the fixed stud being hollow to slidably engage over the pilot when it is in fixed position relative to the valve stem guide.

Still a further object is to provide the abrading member screw threadably mounted on the spindle and means to positively lock the spindle against rotation when it is desirable to screw or unscrew the abrading member relative to the spindle.

With these and other objects in view, my grinder mechanism consists in the construction, arrangement and combination of the various parts thereof, whereby the objects contemplated are attained, as fully set forth in the following specification, pointed out in my claims, and illustrated in the accompanying drawings, in which:

Figure 1 is a side elevation of a valve seat grinder embodying my invention.

Figure 2 is an enlarged vertical sectional view through the transmission housing and spindle thereof showing it in use.

Figure 2a is an enlarged vertical sectional view on the line 2a—2a of Figure 2 showing expanding mechanism in the lower end of a pilot.

Figure 3:
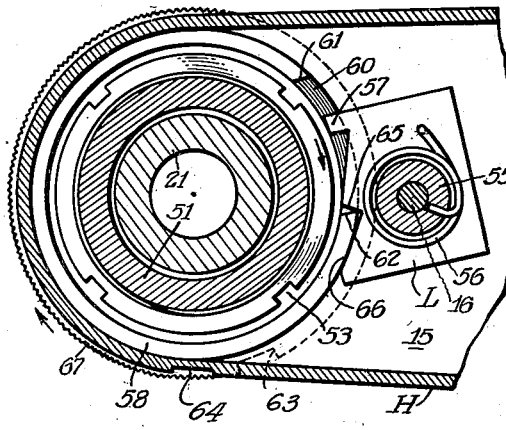
Figure 3 is a sectional view on the line 3—3 of Figure 2 showing a locking arrangement for the spindle, the lock being in normal unlocked position.

On the accompanying drawings I have used the reference character M to indicate generally a motor, H a power transmission housing and S a spindle. The motor M may be of any suitable construction and includes a motor shaft 10. The frame or housing of the motor is indicated at 12, which as shown in Figure 2 surrounds the motor shaft 10 and supports the bearing sleeve 13 in the usual manner. The housing H is split horizontally along its longitudinal center to provide a pair of dished housing members 14 and 15 normally retained in assembled position by a screw 16 at the center of the housing. Locating pins 17 operate in conjunction with the screw 16 to properly locate the portions 14 and 15 relative to each other.

The portion 14 and thereby the housing H is rigidly secured to the motor frame 12 by screws 18 spaced around a hub-like portion 19 of the motor frame 12. The hub-like portion 19 is received in a bore 20 of the housing portion 14.

Fixed relative to the upper wall of the housing H is a hollow stud 21. It is shouldered as at 22 and threaded as at 23 to receive a cap nut 24. The housing portion 14 is provided with a perforation 25 through which the stud 21 extends with the shoulder 22 abutting the inner surface of the housing and the cap 24 tightened against the outer surface thereof. A locating pin 26 prevents undesirable rotation of the stud 21 relative to the housing H.

The stud 21 extends through the lower wall of the housing H, there being provided an enlarged perforation 27 for the stud and parts mounted thereon, as will hereinafter be described. The lower end of the stud 21 has a bore 28 of suitable size to receive a pilot P. The pilot P has a tapered portion 29 to engage the upper end of a bore 30 of a pilot stem guide 31 for properly centering the pilot relative to the guide at this point. Radially movable in the lower end of the pilot P are hardened balls 32 and these may be equi-distantly moved outwardly by the lower end of stem 33. The stem 33 is longitudinally movable relative to the pilot P and for securing such movement and locking the stem relative to the pilot, the stem is threaded as at 34 to coact with threads 35 of the pilot. For rotating the stem 33 I provide a knurled head 36 on the upper end thereof.

Interposed between the lower end of the stem 33 and the balls 32 is a ball 32a. When the stem 33 is rotated, the ball 32a spreads the balls 32 against the inner surface of the bore 30. The balls 32 are thereby concentrically spread and accurately center the lower end of the pilot P relative to the bore 30.

The spindle S is rotatably mounted on the stud 12. For this purpose, ball bearings 37 are provided having inner races 38 and outer races 39. The inner races 38 are located against a shoulder 40 on the stud 21, separated by a spacer sleeve 41 and locked on the stud by a lock nut 42. The outer races 39 are located in the spindle S with the lower race 39 against a shoulder 43 thereof. The upper race 39 is freely movable longitudinally of the bore of the hollow spindle S. The abrading member of my grinder is shown at A and comprises an emery wheel or the like having the usual metal insert 48 screw threadably mounted on the lower end of the spindle S. The abrading member A is suitably shaped or dressed to form the seat of the valve seat insert 49 at the proper angle.

For rotating the spindle S from the motor shaft 10 I provide on the motor shaft a drive pulley 50 and on the spindle S, a driven pulley 51. The pulley 51 is screw threaded in the upper end of the spindle. The two pulleys are belted together by a belt 52 of resilient material such as rubber. When in position on the pulleys this belt is under tension to prevent any slapping thereof against the interior of the housing H and to efficiently transmit rotation from the motor shaft to the spindle. The belt serves as a power transmission means of the power required to rotate the abrading member A and I have found that it eliminates any chattering of the abrading member on the valve seat 49 as caused by gear or chain types of transmissions.

Figure 4:
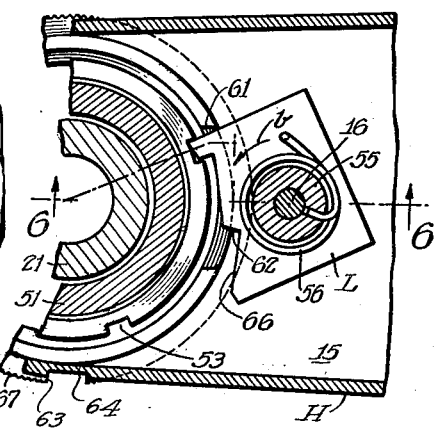
Figure 4 is a similar view showing the lock in locked position.
Figure 5:
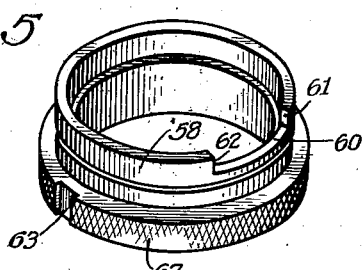
Figure 5 is a perspective view showing the manipulating ring for the lock.
Figure 6:
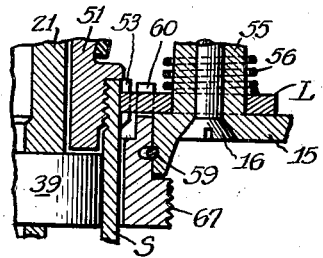
Figure 6 is a sectional view on the line 6—6 of Figure 4.

In order to hold the spindle S while screwing the abrading member A thereon or unscrewing it therefrom I provide locking means consisting of a locking member L and notches 53 formed in the periphery of the spindle S adjacent the top thereof. The member L is pivoted and located inside the housing H, the pivotal connection being accomplished by means of a perforation 54 in the member which is received by a hub 55 of the housing portion 15 through which the screw 16 extends. The locking member L is normally retained in unlocked position as shown in Figure 3 by a spring 56 coiled around the hub 55 and having its opposite ends located in the hub and in the locking member as illustrated. The locking member has a locking lug 57 adapted to enter one of the notches 53 when in locked position as shown in Figure 4.

To swing the lug to the locked position I provide a ring 58 rotatable about the perforation 27 of the housing H. It is retained therein by a spring wire ring 59 against removal therefrom but the ring 59 permits rotation of the ring 58. The ring 58 is provided with a notch 60 terminating in shoulders 61 and 62. The shoulder 61 is adapted to engage the locking finger 57 as shown in Figure 4 for swinging the locking member L in the direction of the arrow b. The exterior of the ring 58 is provided with a notch 63 which serves in conjunction with indicia 64 (see Figure 1) such as the word "lock" to indicate when 63 and 64 are in alignment that the spindle is locked against rotation. The ring 58 is moved to the locked position and at the same time the spindle S is rotated by hand until one of the notches 53 registers with the locking lug 57, whereupon the parts will assume the position shown in Figure 4 and thereafter the abrading member A can be unscrewed relative to the spindle S.

When the ring 58 is released, the spring 56 will return the locking member L to the unlocked position of Figure 3. If it fails to do so, however, I provide means to do so positively comprising the shoulder 62 on the ring 58 adaptable to coact with a shoulder 65 of the locking lug L. When the ring 58 is rotated counter-clockwise in Figure 4, the shoulder 62 will engage the shoulder 65 and rotate the locking member clockwise.

When the locking member L is in unlocked position as shown in Figure 3, a face 66 thereof frictionally engages the ring 58 to prevent accidental movement of the ring to locked position. The ring however can be moved to this position by manually engaging a knurled flange 67 located exterior of the housing H.

Figure 7:
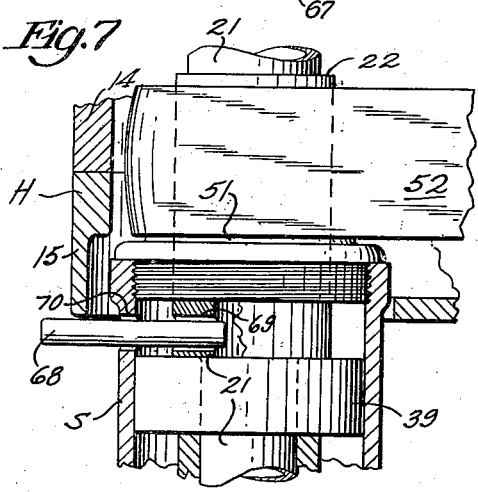
Figures 7 and 8 are sectional views similar to a portion of Figure 1 showing modified forms of the lock.
Figure 8:
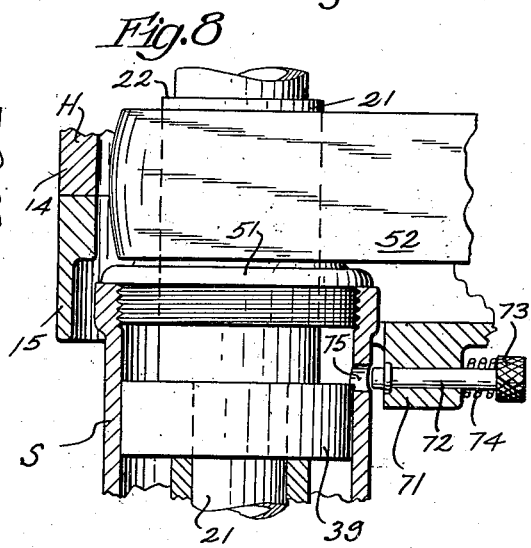
Figure 9:
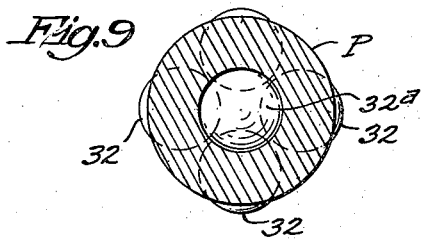
Figure 9 is an enlarged horizontal sectional view of the pilot as taken on the line 9—9 of Figure 2.

In Figures 7 and 8 I show modified arrangements for locking the spindle S against rotation when it is desirable to screw or unscrew the abrading member A relative thereto. In Figure 7 the hollow stud 21 is provided with a perforation 69 and the spindle is provided with a perforation 70. These perforations are adapted to be brought into alignment and a pin or the like 68 can be inserted through them for thus locking the spindle against rotation relative to the stud and thereby relative to the housing H as the stud is stationary relative to the housing. In Figure 8 a lug 71 is formed on the lower portion 15 of the housing H and slidably receives a locking pin 72. The pin is provided with a head 73 which can be manually engaged for pushing the pin into an opening 75 of the spindle S when the opening registers with the pin. Normally the pin 72 is retained in retracted position by a spring 74. From the arrangements described, it is obvious that this locking device can be utilized for accomplishing the result of locking the spindle against rotation so that the abrading member can be unscrewed from the spindle without the use of a tool on the spindle to hold it against rotation.

I have provided a grinder for valve seats which is very simple to construct, assemble and operate. By the use of a pilot of the kind described, the grinder is accurately centered in concentric relation to the valve seat. The grinder, during operation, may be alternately engaged and disengaged relative to the valve seat for grinding the seat and releasing the ground off particles alternately.

Where the valve seat is located in such position that parts of the automobile within the hood would interfere with the motor M if connected directly to the spindle S, the offset arrangement of the spindle relative to the motor shaft and the two being fixed in their proper spaced relation by the housing produces a device which can be used under such circumstances without difficulty.

The off-setting of the grinder spindle relative to the motor shaft also accomplishes a further advantage in that the pulleys 50 and 51 may be of different sizes and thus the proper speed of rotation of the abrading member can be secured relative to the speed of the motor shaft. This advantage cannot be obtained by a direct connection between the motor shaft and the spindle.

When changing abrading members or removing the abrading member for dressing it, the spindle can be readily and effectively locked against rotation without the necessity of providing any tools for this purpose. The foregoing advantages and others also reside in a grinder constructed according to my specification.

Some changes may be made in the construction and arrangement of the parts of my grinder mechanism without however, departing from the real spirit and purpose of my invention. It is therefore my intention to cover by my claims such modified forms of structure or use of mechanical equivalents as may be reasonably included within their scope.

I claim as my invention:

1. In a valve seat grinder, a motor including a rotating motor shaft, a motor frame surrounding said motor shaft, a power transmission housing associated with said frame, a hollow stud fixed to said housing substantially out of alignment with the axis of said motor shaft, the axis of said hollow stud being substantially parallel to the axis of said motor shaft, a hollow spindle journaled entirely on said hollow stud, a work abrading member, means in said housing for transmitting power from said motor shaft to said spindle and thereby to said work abrading member, a pilot in the work, said hollow stud being suitably sized internally for sliding engagement over said pilot for locating said abrading member concentrically with the work.

2. A valve seat grinder comprising, a motor, a power transmission housing associated with said motor, a stud fixed in said housing on an axis substantially out of alignment with the axis of said motor, a hollow spindle revolvably mounted for rotation on said stud and having at its lower end an abrading member screw threadably mounted thereon for engaging the work and coacting means between said housing and spindle to lock said spindle against rotation for the purpose of screwing and unscrewing said abrading member relative to said spindle, said coacting means comprising a notch in said spindle, a pivoted lug in said housing and a ring oscillatable around the axis of said spindle, said ring having a pair of shoulders, one to engage said lug and move it to engage said notch and the other one to engage said lug and move it to disengage said notch.

3. In a valve seat grinder, a motor including a motor shaft and a frame, a spindle revolvably mounted relative to said motor frame and a work abrading member on the lower end thereof, said abrading member being screw threadably mounted on said spindle, a pivoted locking element having a projection spaced from the pivot axis, an opening in said spindle adapted to receive said projection and a locking ring oscillatable on the axis of said spindle for fixing said locking element against pivotal movement after swinging it to a position with said projection in said opening and thereby holding said spindle against rotation while screwing and unscrewing said abrading member relative thereto.

4. In a valve seat grinder, a motor, a power transmission housing associated therewith, a spindle revolvably mounted in said housing and a work abrading member on the lower end thereof, said abrading member being screw threadably mounted on said hollow spindle, a pivoted member having a locking lug element spaced from the pivot axis, means to fix said locking lug element against movement relative to said housing, an opening in said spindle adapted to receive said locking lug element to retain said spindle against rotation while screwing and unscrewing said abrading member relative to said spindle and resilient means to normally retract said locking element from said spindle.

5. In a valve seat grinder, a support, a spindle revolvably mounted relative thereto, a work abrading member on said spindle, said abrading member being screw threadably mounted, a locking lug pivoted to said support, a depression in said spindle adapted to receive said locking lug and means for swinging said locking lug to a position coacting therewith to retain said spindle against rotation while screwing and unscrewing said abrading member relative to said spindle, said means comprising a ring supported by said support, rotatable around said spindle and operatively connected with said locking lug to impart swinging movement thereto when said ring is rotated.

6. In a valve seat grinder, a support, a spindle revolvably mounted thereon, a work abrading member on said spindle, said abrading member being screw threadably mounted thereon, a locking lug pivoted to said support, a depression in said spindle adapted to receive said locking lug and means for swinging said locking lug to a position coacting therewith to retain said spindle against rotation while screwing and unscrewing said abrading member relative to said spindle, said means comprising a ring rotatable around said spindle and having means of engagement with said locking lug to swing it in locking direction when said ring is rotated in one direction and spring means to return said locking lug to unlocked position.

7. In a valve seat grinder, a support, a spindle revolvably mounted thereon, a work abrading member on said spindle, said abrading member being screw threadably mounted thereon, a locking lug pivoted to said support, a depression in said spindle adapted to receive said locking lug and means for swinging said locking lug to a position coacting therewith to retain said spindle against rotation while screwing and unscrewing said abrading member relative to said spindle, said means comprising a ring rotatable around said spindle and having means of engagement with said locking lug to swing it in locking direction when said ring is rotated in one direction and to swing it to unlocked position when said ring is rotated in the opposite direction.

8. In a valve seat grinder, a motor including a rotating motor shaft, a frame surrounding said motor shaft, a power transmission housing associated with said frame, said housing having an opening, a stud fixed in said housing and projecting therefrom through said opening, a spindle revolvably mounted on said stud with a portion in said housing and another portion projecting therefrom through said opening, said spindle thereby rotating on a fixed axis substantially out of alignment with the axis of said motor shaft, a work abrading member on the lower end of said spindle and means in said housing for transmitting power from said motor shaft to the portion of said spindle in said housing.

9. In a valve seat grinder, a motor including a rotating motor shaft, a frame surrounding said motor shaft, a power transmission housing associated with said frame, said housing having an opening in one wall thereof, a stud fixed to another wall of said housing opposite said first wall, said stud projecting through the housing and projecting through said opening and from the housing, a hollow spindle revolvably mounted for rotation on said stud having its axis substantially out of alignment with the axis of said motor shaft, an abrading member on the lower end of said spindle for engaging the work and means in said housing for transmitting power from said motor shaft to said spindle.

10. In a valve seat grinder, a motor including a rotating motor shaft, a frame surrounding said motor shaft, an elongated, relatively flat, power transmission housing associated with said frame, a stud fixed to one wall of said housing, projecting through the housing and through an opening in an opposite wall of said housing, a hollow spindle revolvably mounted for rotation on said stud having its axis substantially out of alignment with the axis of said motor shaft and having on its lower end an abrading member for engaging the work, a motor pulley on said motor shaft within said power transmission housing, a spindle pulley on said spindle within said power transmission housing and a resilient belt around said pulleys and enclosed in said housing for transmitting rotation from said motor pulley to said spindle pulley.

CARL A. OLSON.